(No Model.)
G. WALZEL.
ELASTIC METALLIC TIRE.
No. 523,495. Patented July 24, 1894
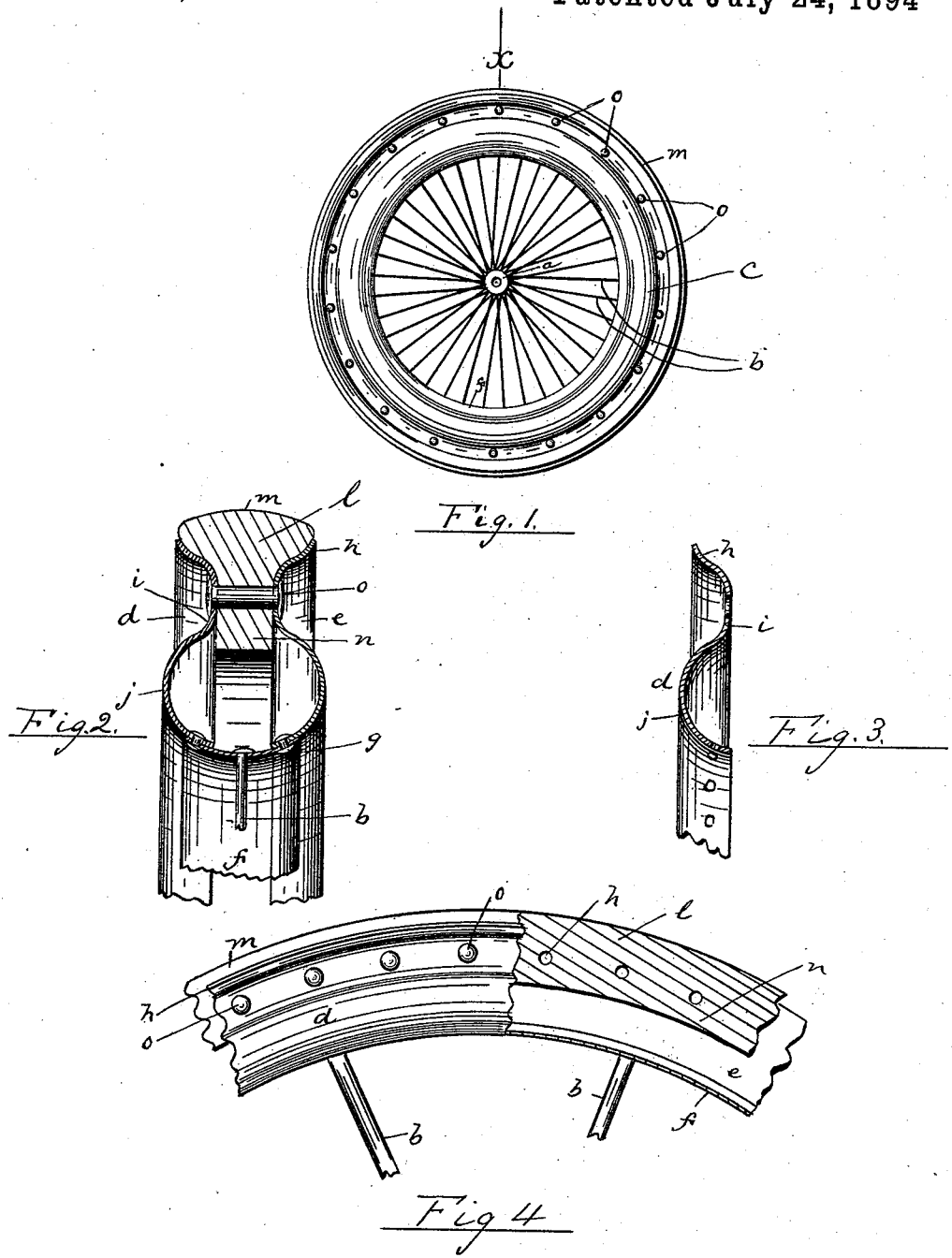
WITNESSES:
Chas. R. Michel.
Louis H. Michel.
INVENTOR
Gregor Walzel,
BY
Oscar A. Michel & Co.
ATTORNEYS.
THE NORRIS PETERS CO., PHOTO-LITHO., WASHINGTON, D. C.

UNITED STATES PATENT OFFICE.

GREGOR WALZEL, OF NEW YORK, N. Y., ASSIGNOR OF ONE-HALF TO STEPHEN LEE, OF SAME PLACE.

ELASTIC METALLIC TIRE.

SPECIFICATION forming part of Letters Patent No. 523,495, dated July 24, 1894.

Application filed October 28, 1893. Serial No. 489,424. (No model.)

*To all whom it may concern:*

Be it known that I, GREGOR WALZEL, a citizen of the United States, residing at New York, in the county of New York and State of New York, have invented an Elastic Metallic Tire for Bicycles, of which the following is a full, clear, and exact description.

This invention relates to a new and useful improvement in flexible or elastic tires for bicycles and the like and in the felly or rim of the wheel whereon the tire is placed.

The invention consists in the construction of the rim of the wheel, the tire of elastic material held on said rim and in the construction and arrangement of the various parts whereby the said tire is firmly yet elastically held on said rim of the wheel.

It consists further in the novel arrangement and combination of parts hereinafter described and claimed.

The invention is illustrated in the accompanying drawings, wherein—

Figure 1 is a side elevation of a wheel embodying my invention. Fig. 2 is an enlarged cross section on line $x$—$x$ Fig. 1 and broken off. Fig. 3 is a cross section enlarged of a portion of one side of the rim of the wheel, and Fig. 4 is a side elevation enlarged of a portion of the rim of the wheel certain parts thereof being broken away for the purpose of illustration.

In said drawings $a$ represents the hub and $b$ the spokes of the wheel which are both by preference of metal although it is obvious that wood or any material may be used. The rim or felly $e$ consists of the two rings $d$ and $e$ preferably of metal and which may be secured together at their lower ends by means of the circular band $f$ to which they are united by bolts or rivets $g$. This band $f$ receives the ends of the spokes $b$ of the wheel. The rings $d$ and $e$ are flexible when riveted being curved or bent as shown in Fig. 2. That is to say, at their upper periphery they flare outward as at $h$ and are next contracted into a neck $i$ and finally bellied outward as at $j$. The tire $l$ of the wheel is preferably of solid rubber and is of the shape in cross section substantially as shown in Fig. 2. That is to say the upper periphery is rounded as at $m$ and the lower portion is flattened or contracted as at $n$.

The tire $l$ is placed between the two rings $d$ and $e$ substantially as illustrated in Fig. 3, the rounded portion $m$ fitting down upon the flaring portion $h$ and projecting slightly above the ends thereof, while the flat portion $n$ is clamped between the necks $i$ and held securely thereto by means preferably of bolts or rivets $o$ traversing the tire $l$ which is perforated as at $p$ to permit the bolt to be passed through it. The contracted end $n$ of the tire $l$ extends but slightly if at all below the necks $i$ hence leaving all or a greater portion of the space $r$ between the bellied out portions $j$ of the rim unoccupied.

The great advantages to be derived from this construction and arrangement of the tire and the rim will be manifest. It avoids in the first place the use of an inflated or pneumatic tire which is easily punctured and thus rendered valueless. The strain on the tire is taken up by the rim which being elastic particularly at the portion shown at $j$ acts similarly as an air cushion. The bearing surface or outer periphery of the tire being solid the resistance or friction of the tire upon the road is greatly less than in the ordinary pneumatic tire.

I do not intend to limit myself to the precise construction of the various details of my invention as modifications thereof may be made without departing from the spirit of my invention.

Having thus described my invention, what I claim as new is—

1. In a wheel, the combination with an elastic tire, of a vertically flexible rim of metal said rim consisting of two rings united together to form both a support for the tire and a flexible air compartment below said tire, substantially as described.

2. In a wheel, in combination with the rings $d$ and $e$ adapted to be clamped together to form an elastic rim, of an elastic tire secured to and between said rings, and adapted to be supported thereon, substantially as described.

3. In a wheel, a rim consisting of the rings $d$ and $e$ having the flaring portions $h$ adapted to receive and support the tire, and the bellied out portions $j$ adapted when the rings $d$ and $e$ are clamped together to form a chamber $r$ thereby giving flexibility vertically to said rim, substantially as described.

GREGOR WALZEL.

Witnesses:
 FREDK. ZIMMER,
 AUG. LEITZ.